United States Patent Office 2,863,775
Patented Dec. 9, 1958

2,863,775

METHOD OF PRODUCTION OF TEA CONCENTRATE DIRECTLY FROM TEA LEAVES WHEN THE LEAVES ARE IN A GREEN STATE, AND PRODUCT OF SAID METHOD

Ramon Perech, New York, N. Y., assignor to Transcontinental Development Company, Vaduz, Liechtenstein, a trust of Liechtenstein No Drawing. Application January 28, 1957
Serial No. 636,472

Claims priority, application Great Britain
September 9, 1954

18 Claims. (Cl. 99—77)

This invention relates to a new and improved tea extract, or concentrate, and their production. More particularly, it relates to an improved tea concentrate obtained directly from the leaf of tea trees, when the leaf is in a green state.

This application is a continuation-in-part of my copending applications Serial No. 473,488, filed December 6, 1954, now abandoned, and Serial No. 588,257, filed May 31, 1956, now abandoned.

All kinds of tea known on the market come from the leaves of the tea tree *Thea Sinensis* which are green in color.

Black tea, originally green in color, owes its characteristic black color, aroma, flavor, etc. to treatment which the leaf undergoes from the moment it is plucked from the tree until the processed tea is packed for shipment. The most important constituents of the tea leaf are caffein and tannin, because tannin is the constituent which provides the tea with the main characteristic astringent property, whereas caffein is appreciated for its stimulating effect.

After the green leaf passes through the withering house where it becomes soft and flexible, it is fed through the rolling machine which breaks up the walls of the leaf so that the inner juices are liberated and consequently fermentation takes place more readily. For example, when such leaves are spread in a moist room, the growth of the oxidizing enzymes is facilitated which, in turn, produces the necessary changes in the constituents of the tea leaves such as tannin, especially its constituents polyphenol and catechol, for the full development of the characteristic flavor, color, taste, etc. of black tea. During oxidation, the coloration of the tea leaves changes at first into yellow and finally into a dark copper-reddish-brown color. As soon as the required oxidation is obtained, the tea leaves are subjected to a so-called "firing" operation to kill the enzymes to prevent further oxidation. Only these treatments account for the difference in color between the green tea, consumed mostly in Asia, and the above described black tea, since the leaves of both kinds are of the same origin and are plucked from the same trees in the same green state.

Whereas the green leaf destined for making green tea does not undergo any treatment of oxidation, black tea, as stated above, owes its differences to the specific treatments, especially to the oxidation of the tannin, particularly its constituents, polyphenol and catechol.

The content of tannin in black tea is lower than the tannin content in green tea. This is due to the fact that part of the tea tannin, which originally existed in the leaves when they were green, is destroyed, or at least rendered insoluble, and lost during the process of withering, breaking the walls of the tea leaf and fermentation to which the leaves are subjected to produce black tea.

It is generally believed that the younger the leaf, the better will be the final quality of the tea, as the younger leaf, known under the name of "flush," is considered to contain the higher percentage of tannin and especially a larger percentage of the enzymes which cause the fermentation of the juices of the broken tea leaf. "Flush" is the young leaf-growth from side branches and stem of the branches which bears the commonly accepted description of "two leaves and bud." The bud is small and unopened; the two leaves are tender and succulent, and fresh yellow-green in color. The other leaves are mostly coarser and some of them are used for extraction of caffein, but generally the coarse leaves contain up to 40% of cellulose and fibres and are mostly regarded as waste and therefore destroyed.

Attempts have been made in the past to concentrate the water soluble constituents of the already processed black tea by bringing the constituents into solution by infusion, followed by concentration and final dehydration into powder, flakes or paste form, etc. The addition of water to the concentrate is alleged to produce the same tea beverage as is usually produced by the infusion of black tea in boiling water. However, up to the present, no satisfactory tea concentrate has been produced.

All the tea concentrates known on the market are of very low quality for the simple reason that, as explained above, the quality of the tea depends, to a considerable extent, on its contents of tannin. As one may see from numerous authoritative analyses (Harler's "Tea Culture and Marketing of Tea," p. 89, Oxford University Press, 1933), the content of tannin (by dry weight) in the fresh tea leaf is some 22%, whereas, when the same leaf is processed to form black tea, the tannin content drops to 12%. This means that during the processing of green tea leaf into black tea some 40% of its original tannin content is lost and by firing leaf content becomes partly caramelized. When the said black tea, with the tannin content already reduced, is brought to the consuming countries and is subjected to the process of extraction and concentration of the soluble constituents, at least 35% of the remaining tannin content is lost anew, and finally the tea concentrate contains only small traces of the flavor, since no less than 65% of the original tannin content is lost.

I have discovered, as the result of experimental research, that it is possible to produce a water soluble oxidized tea extract with a higher tannin content than produced heretofore, by extracting the soluble tea constituents in water not from the already processed black tea, but directly from the fresh tea leaf as plucked from the tree. In accordance with an important embodiment of the invention, instead of oxidizing the tannin of the tea leaf by utilizing the enzymes of the tea leaf, the oxidation is initiated by the use of a catalyst, preferably an inorganic catalyst, the constituents of which are components of the fresh tea leaf itself and its ashes. Calculated by dry weight, the tea concentrate obtained by my experiments may be produced to contain some 18% of oxidized tannin and, when dissolved in water, it produces an oxidized tea beverage of a higher quality than is obtainable by infusions of the best black tea.

Thus, in accordance with this important embodiment of my invention, as disclosed in my above noted copending applications, green tea leaves are finely divided by cutting, grinding or by otherwise comminuting them and their water soluble constituents are extracted therefrom, for instance, in the manner of making a tea infusion by extracting such constituents with boiling water. Then, after separating the tea leaves from the water, the aqueous medium containing the soluble tea constituents is heated in contact with an oxygenous atmosphere, such as air, at temperatures substantially above room temperature, advantageously at temperatures approaching the boiling point of water, i. e., about 80 to 90° C., in the presence of an inorganic oxidizing agent such as mentioned above, until an oxidized tea extract, as contrasted with the green tea extract, is obtained.

The heating to oxidize the water soluble tea extract may take place in a container open to, or in contact with, the atmosphere, or may be hastened by heating in contact with an atmosphere of oxygen. When using oxygen, as such, one must be careful not to heat and oxidize too severely or for too long a period of time.

As is known, it is difficult to evaluate with scientific accuracy the difference between an unoxidized tea extract typified by black tea extract, since such differences are primarily qualitative. Yet, there are distinct qualitative differences which are readily recognized by tea tasters or testers, especially with reference to the aroma, pungency, bitterness or lack of bitterness, quality of the tea liquor, and, to a certain extent, their respective flavors. For instance, essential oils are not present in green tea and the aroma associated with black tea extract created by such oils is recognizable only after the tea leaf has been withered, rolled and oxidized by the enzymes in the tea leaf whereby the essential oils are created or released. However, during the necessary firing of the fermented black tea leaf much of the essential oils developed are vaporized off and the leaves acquire a caramelized malt-like aroma which is readily recognized after removal from the firing oven. It is believed that the aroma associated with black tea infusions is largely attributable to the caramelized aroma acquired during firing. Also, green tea is bitter, while oxidized tea is not. In addition, oxidized tea in an aqueous medium has a characteristic deep copper-reddish-brown color and has liquor quality which readily distinguishes it from the aqueous extracts of green tea.

Likewise, it is difficult to evaluate with scientific exactitude the qualitative characteristics of the new and superior oxidized tea extracts of this invention and to specify an exact period of heating to obtain the desired degree of oxidation. Yet the foregoing physical and qualitative properties of black tea extracts, also an oxidized tea extract, much more nearly approximate the characteristics of the unique oxidized water soluble tea extracts of this invention than those associated with green tea extracts. Substantial absence of bitterness and color analogy with black tea infusions will be of special assistance in determining the degree of oxidation required to develop the distinctive aroma, flavor and body in my novel tea extracts. A tea tester can readily recognize the desired properties in my new tea extract.

Generally speaking, however, when using an inorganic oxidation catalyst of the type mentioned above, such as potassium permanganate, and heating at a temperature of about 80 to 90° C., it is necessary to heat water infusions of the green tea leaves in contact with the atmosphere for a period of time of at least two hours. Usually up to six hours of heating at about 80 to 90° C. are entirely sufficient, and frequently four to five hours of heating are adequate. Heating in contact with oxygen per se, instead of air, as an oxygenous atmosphere may take a lesser period of time but introduces problems in controlling the oxidation. Also, if the temperatures are maintained nearer the boiling point of water, somewhat less periods of heating may be used. But heating periods substantially in excess of one hour normally are required, before a satisfactory degree of oxidation is obtained. Where oxygen is used as an oxygenous atmosphere oxidized teas considered superior to known teas may be obtained after less than one hour of heating. The speed of oxidation is related to the oxidation temperatures, but no apparent advantage is obtained by heating at temperatures substantially below 80° C. and by using such temperatures the period of heating is thereby unnecesasly increased. At any rate, the oxidation obtained by heating green tea leaf extract in contact with an atmosphere containing oxygen is not a usual fermentation oxidation since it normally takes place at temperatures substantially in excess of fermentation temperatures heretofore used for the formation of black tea which advantageously takes place at about 30° C.

In accordance with a less desirable procedure a satisfactory oxidized tea extract can be obtained by heating the extract of the green tea leaves, without the addition of a catalyst, in an aqueous medium exposed to the atmosphere at the aforesaid temperatures for a period of time of about 6 to 10 hours. Such a procedure does not achieve any advantageous result and unnecessarily prolongs the oxidation process. Heating in contact with an atmosphere of oxygen may be accomplished in less time, but here also, the oxidation reaction may be more difficult to control.

Surprisingly, experiments have proved that, in spite of the fact that the flush leaf contains only up to 10% of cellulose, while coarse leaf contains up to 40% of cellulose and fibres, the difference in percentage of cellulose and fibre contents does not prevent me from producing a superior tea extract regardless of the kind of tea leaf used. It is necessary only to extract the soluble constituents from any tea leaf available, eliminate the insoluble material, mainly the cellulose and the fibre, and then oxidize as described above. Analyses of the soluble constituents of various kinds of leaf proved to me that their chemical composition did not vary appreciably. Tea extracts, regardless of the type of leaf used, prepared by aqueous extraction of the water soluble constituents of green leaf and thereafter subjecting the aqueous extract to oxidation in an atmosphere containing oxygen, provides a tea beverage of even higher quality than made by infusion of high grade black tea.

While I do not wish to be bound by any theory, I believe the very new and attractive flavor and aroma of my oxidized tea extract is due not only to its higher percentage of tannin content, but also to the completely controlled oxidation and development of essential oils in a heated aqueous solution. Such results cannot be duplicated in a fermentation process, followed by firing, as in the production of black tea. Since my process does not involve firing, there is no loss of essential oils or volatile ingredients convertible to essential oils or other aroma or flavor modification attributable to such a step. Thus, in my process the aqueous solution of the water soluble constituents of the comminuted green tea leaves, after the separation of the tea leaves, is subjected to fully controlled oxidation at the specified elevated temperatures until the copper reddish-brown color, specific aroma imparted by the developed essential oils and flavor are obtained and the solution loses its excessive bitterness.

I have established that the very bitter taste possessed by the water soluble constituents extracted from the green leaf in aqueous solution is due exclusively to bitter taste properties of its tannin content, more particularly polyphenol and catechol. I succeeded in eliminating this bitter taste during the prolonged heating of the aqueous solution up to 6 hours, or more, under a temperature approaching boiling point of water. During this period of time the oxidation of tannin compounds not only occurs but, also, the condensation or polymerization of the polyphenol and catechol compounds with other constituents, probably with the protein bodies of the solution, apparently occurs. In this way, due to the oxidation of the tea tannin and the probable condensation of polyphenol, catechol and water-soluble protein bodies, the bitterness imparted by the polyphenols and catechols may be inactivated or rendered innocuous and consequently the final tea concentrate thereby loses its bitter taste.

I also employ a partial variation of my method by first exposing the comminuted fresh green tea leaves, without withering, to the action of the oxygen of the air until the comminuted mass of the leaves becomes dark brown in color. Thereafter I extract the water-soluble constituents, for example, by percolation with boiling water or steam, I subject the obtained aqueous solution to heating for a period of 1 to 4 hours at a temperature of 10 to 20° C. below the boiling point of water until the required degree of oxidation and condensation of the polyphenol and catechol compounds with the other constituent bodies of the solution takes place and the solution thereby loses, or substantially loses, its bitter taste. In such a modification of my process the withering and firing associated with the production of black tea should be avoided, since the quality of the extract is thereby impaired.

The disadvantage of the variation of my method wherein the comminuted or otherwise broken leaves are exposed to oxidation by the oxygen of the air before percolation is believed due to some of the soluble constituents becoming insoluble and, therefore, during the subsequent percolation, a substantial decrease of the extracted soluble constituents occurs. The yield of the final solid content may be 15% or more lower than the yield obtained when fresh green leaves are comminuted and immediately undergo percolation. Yet the proposed modification is a substantial improvement over black tea production both in quality and yield, for, as stated, my process normally produces a tea extract containing 50% or more soluble tannin than is retained in the black tea of commerce.

As stated, in order to perform the oxidation of the water-soluble constituents extracted from the green tea leaf and to obtain a homogeneous and constantly uniform tea concentrate, I prefer to use as oxidizing catalyst a small quantity of an oxidizing inorganic compound which catalyzes the oxidation of the tea tannin rather than relying on the enzymes to perform fermentation and oxidation of the tea tannin compounds in the green leaf, as is done in the production of black tea. Preferably, I use as catalyst potassium permanganate ($KMnO_4$) customarily in an amount of about 0.02 to 0.10% (preferably about 0.03 to 0.06%) of the dry weight of the tea concentrate in effecting the oxidation of the water-soluble constituents of the green tea leaf as well as of the green tea already partly processed. According to the composition of the soluble constituents and the type of the tea leaf, the percentage by weight of the catalyst may be increased or decreased, according to the requirements of every batch.

Customarily the tea leaf contains some 5.20% of inorganic matter of which from 1.40 to 4.25% of these compounds are manganic oxide ($Mn_2O_3$) and some 50% potassium monoxide ($K_2O$). Thus, by introducing minute quantities of potassium permanganate as catalyst, I introduce no foreign matter, as potassium as well as manganese are natural constituents of the tea leaf. (See Chemical Composition of Human Foods, by Dr. Joseph Konig, page 1015.)

I have established that the presence of the catalyst ($KMnO_4$) in my process greatly surpasses the reaction which the enzymes achieve in fermentation and oxidation of the tannin compounds in the green leaf when converting them into black tea.

After the introduction of the catalyst into the aqueous solution of the water soluble constituents of the tea leaf or of the green tea, the solution is heated for a period of time of at least 1 to 2 hours and up to 6 hours, at the temperature of from 10 to 20° C. lower than the boiling point of water, during which period homogeneous and complete oxidation of the tannin in solution takes place, and as well, during the same period of time, the polymerization or condensation of polyphenol and catechol compounds with the protein bodies of the solution occurs, and, in this way, eliminates the inherent bitterness of the green tea leaf constituents in solution.

In accordance with another alternative, but somewhat less advantageous method, by firing or steaming, the enzymes of green tea leaves may be killed and the leaves dried and stored for later processing. In this procedure, the soluble constituents of the dried green tea leaves, preferably after being comminuted, may be subjected, after extraction in aqueous solution, to oxidation by my method by introducing the oxidizing catalyst, and heating until required oxidation and other reaction are completed to produce an oxidized tea extract having the properties approximating those previously described.

I have established, also, that the process of this invention may be used to improve the quality of water soluble constituents extracted from so-called green tea which normally contains about 50% more soluble tannin than black tea. The method of application is the same as that applied to the liquor obtained from the comminuted green tea leaves.

My experimenut also demonstrated that the water soluble constituents of already processed black tea, after extraction of the soluble constituents and removal of the tea leaves, may be subjected to an additional oxidation of its soluble tannin content in accordance with the process of this invention. In this way the quality of the black tea infusion is greatly enhanced as well as the quality of any black tea concentrate made therefrom. The great improvement imparted to the black tea infusions imparted by the oxidation process of this invention is probably due to the evolution or release of essential oils.

After the oxidation and reactions, or condensations, as described above, are performed, I may eliminate the excess water by evaporation under a partial vacuum, by spray drying, or by any other method known in the industry to convert the concentrate into a paste, powder, flakes, etc.

On the other hand, the oxidized water soluble tea extract may be left in liquid state and offered on the market as a beverage in bottles, cans, etc. The oxidized extract, without concentration, is a concentrate in the sense that it usually contains 5 to 6% of water soluble ingredients extracted from tea. Customarily tea, as drunk, contains much lesser quantities of extracts from the tea leaf.

I have established that during the process of evaporation of the excess water under vacuum, the initially evaporated water contains most of the specific flavor and aroma proper produced by my method. When the initially evaporated water of the solution extracted under a vacuum, say up to 5%, or even 3 to 4%, is separated and mixed with a dry tea concentrate already produced by my method, I produce a tea concentrate in paste form of the desired consistency with a natural flavor and an aroma far superior to the best black tea infusion. In a like manner other concentrates may be made.

In accordance with a simplified embodiment of the invention, the essential oils and the resulting flavor and aroma are initially developed in such a way that they never leave the concentrate from the moment they are developed and are always retained in the concentrate.

As explained above, the essential oils, flavor and aroma in the extracted water soluble constituents of the tea leaf are formed only when the aqueous solutions of the water soluble constituents of the tea leaf are exposed to oxidation by an oxygenous atmosphere, such as air, at a preferred temperature of about 10 to 20° C. below the boiling point of water. Now I have found that, directly after performing the percolation by steam or boiling water, the obtained solution may be immediately submitted to evaporation under vacuum to produce the desired concentration of the water soluble constituents. In this way no substantial oxidation takes place during the production of the concentrate and, as a result, no essential oils are developed. After the desired degree of concentration is obtained, distillation is discontinued and the final concentrate is exposed to oxidation, in the manner described above, until the essential oils, flavor and aroma are developed. By this procedure the tea concentrate always retains the desired aroma and flavor.

As stated, the normal extract, before concentration, contains about 5 to 6% of water soluble extracts of the unprocessed tea leaf. The degree of concentration before oxidation is largely a matter of choice, although, under any circumstance, a significant and substantial proportion of the about 94–95% water would be removed. This choice is determined by end use, desired consistency, fluidity, etc. Customarily a major part of the water, at least, is removed before the water soluble constituents of the green tea is subjected to oxidation. However, the concentrate should contain at least 40 to 60% water, i. e., not more than 60 to 40% solids, if oxidation is to take place readily. Such a product is sufficiently concentrated for most commercial purposes. Moreover, in this concentration, the oxidized concentrate can be spray dried to remove this small amount of residual water and thereby produce a dry product without an excessive loss of aroma or flavor. Thus, in accordance with one embodiment of my invention, the aqueous extract of the green tea leaves is concentrated to obtain a spray dryable extract before the extract is subjected to oxidation. Where the tea extract is only partially concentrated before oxidation and the tea extract further concentrated after oxidation, the first 3–5% of the distillate should be returned to the ultimate concentrate, as explained previously.

The following examples illustrate my procedures for concentrating my water soluble tea extract before it is oxidized.

Example 1

I take 20 lbs. of ground, cut or otherwise broken or powdered, raw, untreated leaves of any tea tree and by heating the leaves in water, by steam or boiling water, or by any other method of extraction known in the industry, extract from the leaves all or most of the water soluble constituents. After this extraction is performed, I separate the exhausted leaves from the solution and, in order to effect the homogeneous oxidation of the tannin in the solution, add potassium permanganate to the obtained solution is an amount of 0.06% reckoned by the dry weight of the extracted constituents of the tea leaves, and then heat the solution at some 90° C. until the oxidation is completed and the solution becomes deep copper-reddish-brown in color, develops the special flavor, aroma, etc. superior to the best black tea infusion, thereby losing the bitter taste of the infusion of green tea. The percentage of the added catalyst, as well as the time during which the solution should be heated, may be increased or decreased, and the treatment is to be stopped as soon as the required degree of oxidation is attained and the solution has lost its specific bitterness as a result of condensation or other reaction of polyphenol and catechol with the protein bodies of the aqueous solution of the constituents of the leaves. The desired degree of oxidation usually is obtained in about 2 to 6 hours.

If a concentrate is desired, the excess water can be eliminated in a known manner, such as by continued heating out of contact with the air, by vacuum distillation, spray drying or by any combination thereof.

Example 2

I also employ a variation of the method described in Example 1 to produce a high quality oxidized tea concentrate. In accordance with this variation the fresh green tea leaves are comminuted and subjected to oxidation, in part at least, before aqueous extraction. I take a mass of 20 lbs. of ground, cut, or otherwise finely broken fresh green tea leaves plucked from the trees and expose this broken mass of tea leaves to the action of the oxygen of the air for a duration up to two hours until the mass becomes dark brown in color. I subject these broken tea leaves, already subjected to oxidation, to percolation by boiling water or steam to extract and to bring into solution the water soluble constituents of the tea leaves. After the exhaused broken leaves are separated from the solution I heat the obtained solution in the open air for up to four hours at a constant temperature of 80 to 90° C. until the required degree of oxidation is effected and the solution becomes copper-reddish-brown in color, the solution loses its original bitter taste, and develops the special flavor, aroma and taste equal or superior to that of an infusion of higher grades of black tea. The professional tea tester by testing can easily determine when the obtained product reaches its best quality.

In the alternative, I may effect oxidation as well as condensation of a solution of the water soluble constituents without preliminary fermentation by exposure of the comminuted leaves to the oxygen of the air in raw state by extracting the water solubles directly after the green leaves are broken and then oxidizing as in Example 1.

The excess of water in the solution is evaporated or otherwise eliminated until the desired degree of concentration is attained. If desired, the concentrate may be converted into powder, paste, etc. by any of the methods known to the industry, or left in fluid or semi-fluid state. It also may be left unconcentrated and used as a cold drink in bottles or cans.

Example 3

I take 20 lbs. of fresh leaves directly plucked from the tea trees, and pass them through a colloidal or other finely grinding mill known to the industry. As the leaves, when plucked from the trees, contain by weight some 75% of water, by passing them through the mill, especially by adding some water, they become converted into a heavy semi-fluid mass wherein the fluid contains a large part of the water soluble constituents. This fluid mass is immediately passed through a dense strainer to separate the liquid from the insoluble constituents of the leaves and to permit the liquid to flow by gravity into a container. In order to extract the soluble constituents remaining in the strained-off cellulose, fibres, etc., the latter are subjected to percolation by steam or boiling water and passed finally through a filter press or hydraulic press. After all the obtained liquids are mixed together, 0.8 gram of potassium permanganate is added as a catalyst and the liquor is heated at a temperature of 80 to 90° C. for a period of time up to 6 hours. The percentage of the added catalyst, as well as the time during which the liquid should be heated, may be increased or decreased, and the treatment is to be stopped as soon as the required degree of oxidation is attained and the liquid has lost, or substantially lost, its original bitter taste. After subjecting the oxidized tea extract to a final rigorous filtration, the concentrate may be converted into a paste, powder, or any other form of concentrate.

Example 4

I take 20 lbs. of commercial green tea and by steaming, boiling water, or any other means of extraction known in the industry, extract all or most of the water soluble constituents of the green tea. After separation of the exhausted green tea from the solution I add potassium permanganate reckoned by dry weight as 0.06% of the weight of the extracted soluble constitutents of the green tea.

After the catalyst is added and thoroughly mixed in the solution, I heat the solution at a temperature of 80 to 90° C. for a period of time up to 6 hours until the solution becomes deep copper-reddish-brown in color and develops the flavor, aroma and color of black tea infusion made of the best black tea. The heating may be discontinued as soon as the tea tester approves the product. Those skilled in the art may increase or decrease the proportion of the added catalyst according to need.

Example 5

I take 20 lbs. of commercial black tea as available on the market, and by steam or other medium of percolation extract all or most of the water soluble constituents of the black tea. After the exhausted tea is separated from the solution, I add as catalyst some 0.02% (of the dry weight of the extracted water soluble constituents) of potassium permanganate to effect an additional oxidation of the tea tannin in the solution by heating at elevated temperatures such as disclosed in the preceding examples. Since the tea tannin or other ingredients are subjected to additional oxidation, the black tea extract becomes greatly improved and, when concentrated, produces a greatly improved black tea concentrate.

Example 6

I take 20 lbs. of ground, cut or otherwise broken raw, untreated tea leaves of any tea tree and, according to methods known in the industry, I extract all or most of the soluble constituents of the tea leaves. After the exhausted leaves are separated from the solution, I heat the water soluble consituents of the tea leaves in open air, under a temperature of about 80° C. until the solution through oxidation by the oxygen of the air becomes colored to a deep copper-reddish-brown color. I evaporate the excess of water in the tea solution until the desired degree of concentration is performed. The desired color, aroma, flavor and body is developed in 6 to 10 hours.

If desired, the concentrate may be converted into a powder or flakes by spray or drum drying.

The following examples illustrate my procedures for concentrating my water soluble tea extract before it is oxidized.

Example 7

One hundred (100) pounds of comminuted and unprocessed tea leaf are subjected to extraction as disclosed in the preceding examples. After separating the insoluble parts of the tea from the solution, the solution is submitted to vacuum evaporation, or other types of concentration, until the desired degree of consistency in the concentrated solution is obtained. Where desired, the solution is concentrated until the water content of the concentrate is about 40-60%. Then the unoxidized concentrate is exposed to oxidation by the action of the oxygen of the atmosphere by heating it at about 80 to 90° C. for at least 1 to 4 hours.

In accordance with a preferred practice, the originally extracted solution of the water soluble constituents of the tea leaf is directly subjected to concentration in order to avoid the development of essential oils, through oxidation by exposure to the atmosphere, which would vaporize off during the concentration. It will be understood, however, that little oxidation will take place in the absence of heating and that, if desired, the solution could be shielded against the action of the atmospheric oxidation, for example in a closed container, and concentrated later. Of course, such an alternative procedure would offer no advantages and would not take advantage of the fact that the solution containing water soluble extracts is normally a very hot solution and therefore in a favorable state for concentration.

The time of heating the solution after it has been concentrated may be regulated in accordance with the criteria disclosed in the preceding examples. By proceeding in the manner disclosed in this example the formed essential oils, flavor and aroma are always retained in the concentrate since the solution of the soluble constituents of the tea leaf are not subjected to treatments which vaporize off the essential oils subsequent to their being developed.

Example 8

In accordance with a preferred procedure, 100 pounds of comminuted and unprocessed leaf of tea trees are subjected to percolation by steam or boiling water. After separating the insoluble parts of the tea leaf from the formed solution, the solution is concentrated as disclosed in Example 7. Then 0.03 to 0.06% of potassium permanganate, based upon the dry weight of the water soluble constituents of the concentrated solution, is added as an oxidation catalyst. The concentrate, containing the catalyst, is subjected to oxidation by the oxygen of the air by heating the solution in contact with the atmosphere at a preferred temperature of 80 to 90° C. for 1 to 4 hours, or longer, if necessary.

In this example, as in the preceding example, the essential oils, flavor and aroma imparting ingredients are only developed after the concentration has taken place. Thus, the flavor and aroma imparted by the oxidation through the development of the essential oils, or the like, always remain with the concentrate.

The percentage of catalyst used and the treatment times may be regulated as described in the other examples using a catalyst.

While the catalyst emphasized in the foregoing examples is disclosed as potassium permanganate, it should be understood that other inorganic oxidation catalysts may be used to develop the same or kindred qualities in the tea. For example, copper (or cupric) oxide has proven capable of developing substantially the same quality of tea, but it is not considered acceptable from the standpoint of food technology.

The produced concentrates, when mixed with water, instantly enter into solution and, in accordance with an important embodiment of the invention, produce a tea beverage of much higher quality than any tea concentrate heretofore produced, since the new product is made directly from the green tea leaf and contains nearly all the tannin which the leaf contains when plucked from the trees and, through oxidation in solution, develops a controlled and unique aroma, flavor and liquor quality.

The term "concentrate" is used herein to denote either dry or semi-liquid and liquid tea products from which some of the original water used to dissolve and oxidize the soluble constituents of tea has been removed.

The present invention provides a new and improved tea product, having many advantages in the food industry, and especially adapted not only for making tea for beverage purposes, but also for making tea ice cream, iced tea drink in bottles, and other flavoring purposes.

It should be understood that the foregoing general disclosure and examples are illustrative and that details therein disclosed can be modified without departing from the scope and spirit of the invention which is intended to be defined in the appended claims.

What is claimed is:

1. A process for producing an improved water soluble oxidized tea extract, which comprises preparing a water extract from tea leaves and heating the aqueous extract at an elevated temperature below the boiling point of water in contact with an oxygenous atmosphere for at least one hour so that water soluble constituents are oxidized in the aqueous extract medium.

2. A process for preparing an improved water soluble oxidized tea concentrate, which comprises preparing a water extract from tea leaves, separating the tea leaves from resulting aqueous extract, concentrating the aqueous extract by evaporating water therefrom while avoiding substantial oxidation, and heating the aqueous extract at an elevated temperature below the boiling point of water in contact with an oxygenous atmosphere for at least one hour so that water soluble constituents are oxidized in the aqueous extract medium.

3. A process for preparing an improved water soluble oxidized tea concentrate, which comprises preparing a water extract from comminuted tea leaves, separating insoluble substances from the resulting aqueous extract, concentrating the aqueous extract by vacuum evaporation of water and heating the aqueous extract at an elevated temperature below the boiling point of water in contact with an oxygenous atmosphere for at least one hour so that water soluble constituents are oxidized in the aqueous extract medium and until the bitterness in the extract is susbtantially dissipated.

4. A process for preparing an improved water soluble oxidized tea concentrate, which comprises preparing a water extract from tea leaves, heating the aqueous extract at an elevated temperature below the boiling point of water in contact with an oxygenous atmosphere for at least one hour so that water soluble constituents are oxidized in the aqueous extract medium, and concentrating the aqueous extract by evaporating water therefrom.

5. A process for preparing an improved water soluble oxidized tea concentrate, which comprises preparing a water extract from cominuted tea leaves, separating insoluble substances from the resulting aqueous extract, concentrating the aqueous extract by vacuum evaporation of water until a spray dryable concentrate is obtained, heating the aqueous extract at an elevated temperature below the boiling point of water in contact with an oxygenous atmosphere for at least one hour so that water soluble constituents are oxidized in the aqueous extract medium, and spray drying the obtained concentrate.

6. A process for preparing an improved water soluble oxidized tea concentrate, which comprises preparing a water extract from tea leaves, heating the aqueous extract at an elevated temperature below the boiling point of water in contact with an oxygenous atmosphere for at least one hour so that water soluble constituents are oxidized in the aqueous extract medium, concentrating the aqueous extract by evaporating water therefrom, and returning to the concentrate a minor part of the distillate distilled off including the distillate first distilled off.

7. A process for producing an improved water soluble oxidized tea extract, which comprises preparing a water soluble extract from tea leaves, adding an innocuous inorganic oxidation catalyst to the obtained extract, and heating the aqueous extract at an elevated temperature below the boiling point of water in contact with an oxygenous atmosphere for at least one hour so that water soluble constituents are oxidized in the aqueous extract medium.

8. A process for producing an improved water soluble oxidized tea extract, which comprises preparing a water soluble extract from tea leaves, adding potassium permanganate to the obtained extract, and heating the aqueous extract at an elevated temperature below the boiling point of water in contact with an oxygenous atmosphere for at least one hour so that water soluble constituents are oxidized in the aqueous extract medium.

9. A process for producing an improved water soluble oxidized tea extract, which comprises preparing a water extract from raw green tea leaves, and heating the aqueous extract at an elevated temperature below the boiling point of water in contact with an oxygenous atmosphere for at least one hour so that water soluble constituents are oxidized in the aqueous extract medium.

10. A water soluble oxidized tea extract produced by the process of claim 9.

11. A process for preparing an improved water soluble oxidized tea concentrate, which comprises preparing a water extract from raw green tea leaves, concentrating the aqueous extract by evaporating water therefrom, and heating the concentrated aqueous extract in the presence of an inorganic oxidation catalyst at an elevated temperature below the boiling point of water in contact with an oxygenous atmosphere for at least one hour so that water soluble constituents are oxidized in the aqueous extract medium.

12. A water soluble oxidized tea concentrate produced by the process of claim 11.

13. A process for producing an improved water soluble tea extract, which comprises preparing a water extract from comminuted raw green unprocessed tea leaves, separating the tea leaves from the resulting aqueous extract, and heating the aqueous extract in the presence of an innocuous inorganic oxidation catalyst in contact with air between 1 to 6 hours so that water soluble constituents are oxidized in the aqueous extract medium.

14. A process for preparing an improved water soluble oxidized tea extract, which comprises partially oxidizing the water soluble constituents of tea leaves by fermentation until the leaves become dark brown in color, preparing a water extract from the partially fermented tea leaves, and heating the aqueous extract at an elevated temperature below the boiling point of water in contact with an oxygenous atmosphere for at least one hour so that water soluble constituents are oxidized in the aqueous extract medium.

15. A process for preparing an improved water soluble oxidized tea extract, which comprises exposing raw tea leaves as such to air until the leaves become dark brown in color and so that a minor part of the ultimate oxidation of its oxidizable content is obtained, preparing a water extract from the partially fermented tea leaves, and heating the aqueous extract at an elevated temperature below the boiling point of water in contact with an oxygenous atmosphere for at least one hour so that water soluble constituents are oxidized in the aqueous extract medium.

16. A water soluble oxidized tea extract produced by the process of claim 15.

17. A process for producing an improved water soluble oxidized tea extract, which comprises preparing a water soluble extract from processed green tea, adding an innocuous inorganic oxidation catalyst to the obtained extract, and heating the aqueous extract at elevated temperature below the boiling point of water in contact with an oxygenous atmosphere for at least one hour so that water soluble constituents are oxidized in the aqueous extract medium.

18. A process for producing an improved water soluble oxidized tea extract, which comprises preparing a water soluble extract from black tea, adding an innocuous inorganic oxidation catalyst to the obtained extract, and heating the aqueous extract at elevated temperature below the boiling point of water in contact with an oxygenous atmosphere for at least one hour so that the water soluble constituents of the black tea are oxidized in the aqueous extract medium.

References Cited in the file of this patent

UNITED STATES PATENTS

| 726,102 | Roger et al. | Apr. 21, 1903 |
| 2,476,072 | Tressler | July 12, 1949 |
| 2,639,237 | Johnston et al. | May 19, 1953 |

FOREIGN PATENTS

| 4,299 | Great Britain | Dec. 30, 1899 |
| 20,527 | Great Britain | Aug. 13, 1898 |

OTHER REFERENCES

"Food and Food Adulterants," Dept. of Agriculture, Division of Chemistry, 1892, pp. 890–891.

UNITED STATES PATENT OFFICE
CERTIFICATE OF CORRECTION

Patent No. 2,863,775            December 9, 1958

Ramon Perech

It is hereby certified that error appears in the printed specification of the above numbered patent requiring correction and that the said Letters Patent should read as corrected below.

Column 7, line 43, for "solution is" read -- solution in --; column 10, lines 73 and 74, for "concentrtaing" read -- concentrating --; column 11, line 5, for "susbtantially" read -- substantially --.

Signed and sealed this 2nd day of June 1959.

(SEAL)
Attest:

KARL H. AXLINE            ROBERT C. WATSON
Attesting Officer            Commissioner of Patents